(12) United States Patent
Zhu et al.

(10) Patent No.: US 8,861,597 B2
(45) Date of Patent: Oct. 14, 2014

(54) DISTRIBUTED CHANNEL TIME ALLOCATION FOR VIDEO STREAMING OVER WIRELESS NETWORKS

(75) Inventors: Xiaoqing Zhu, Stanford, CA (US); Petrus J. L. van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 2339 days.

(21) Appl. No.: 11/726,349

(22) Filed: Mar. 20, 2007

(65) Prior Publication Data

US 2008/0069201 A1    Mar. 20, 2008

Related U.S. Application Data

(60) Provisional application No. 60/845,582, filed on Sep. 18, 2006.

(51) Int. Cl.
  *H04N 7/12* (2006.01)
  *H04N 21/4363* (2011.01)
  *H04N 21/41* (2011.01)
  *H04N 21/436* (2011.01)

(52) U.S. Cl.
  CPC ... *H04N 21/43615* (2013.01); *H04N 21/43637* (2013.01); *H04N 21/4113* (2013.01)
  USPC ............... 375/240.1; 375/240.16; 375/240.26

(58) Field of Classification Search
  USPC .......... 370/240.1, 240.16, 240.26; 375/240.1, 375/240.16, 240.26
  See application file for complete search history.

(56) References Cited

U.S. PATENT DOCUMENTS

| | | | |
|---|---|---|---|
| 5,159,447 A | 10/1992 | Haskell et al. | |
| 5,506,686 A | 4/1996 | Auyeung et al. | |
| 5,541,852 A | 7/1996 | Eyuboglu et al. | |
| 5,546,377 A | 8/1996 | Ozveren | |
| 5,548,581 A | 8/1996 | Makrucki | |

(Continued)

FOREIGN PATENT DOCUMENTS

| | | |
|---|---|---|
| EP | 1 026 855 | 6/2000 |
| EP | 1 047 223 A2 | 10/2000 |

(Continued)

OTHER PUBLICATIONS

"IEEE Wireless LAN Edition: A compilation based on IEEE Std 802.11—1999 (R2003) and its amendments," IEEE Standards Information Network, IEEE Press, Copyright 2003.

(Continued)

*Primary Examiner* — Farid Homayounmehr
*Assistant Examiner* — Suman Debnath
(74) *Attorney, Agent, or Firm* — Chernoff Vilhauer McClung & Stenzel, LLP (57) ABSTRACT

A system for transmitting video from a plurality of transmitters to a plurality of receivers over a shared wireless channel includes a plurality of transmitters each receiving a respective video stream to transmit over the shared wireless channel. Distortion-related information is associated with each of the respective video streams and each of the plurality of transmitters having access to the distortion-related information for the respective video stream while not having access to the distortion-related information for other the video streams. Each of the plurality of transmitters using the respective distortion-related information of the respective the video stream to determine how to modify the video stream for transmission based upon a channel time constraint.

46 Claims, 4 Drawing Sheets

(56) References Cited

U.S. PATENT DOCUMENTS

| | | |
|---|---|---|
| 5,606,369 A | 2/1997 | Keesman et al. |
| 5,742,594 A | 4/1998 | Natarajan |
| 5,805,220 A | 9/1998 | Keesman et al. |
| 5,936,940 A | 8/1999 | Marin et al. |
| 5,978,236 A | 11/1999 | Faberman et al. |
| 5,982,778 A | 11/1999 | Mangin et al. |
| 5,995,705 A | 11/1999 | Lang |
| 6,014,694 A | 1/2000 | Aharoni et al. |
| 6,049,549 A | 4/2000 | Ganz et al. |
| 6,055,578 A | 4/2000 | Williams et al. |
| 6,167,084 A | 12/2000 | Wang et al. |
| 6,167,253 A | 12/2000 | Farris et al. |
| 6,233,226 B1 | 5/2001 | Gringeri et al. |
| 6,263,503 B1 | 7/2001 | Margulis et al. |
| 6,275,497 B1 | 8/2001 | Varma et al. |
| 6,275,531 B1 | 8/2001 | Li |
| 6,292,834 B1 | 9/2001 | Ravi et al. |
| 6,300,665 B1 | 10/2001 | Peeters et al. |
| 6,310,495 B1 | 10/2001 | Zhang |
| 6,343,085 B1 | 1/2002 | Krishnan et al. |
| 6,351,153 B1 | 2/2002 | Fischer |
| 6,363,056 B1 | 3/2002 | Beigi et al. |
| 6,377,624 B1 | 4/2002 | Keesman |
| 6,389,068 B1 * | 5/2002 | Smith et al. .................. 375/225 |
| 6,434,606 B1 | 8/2002 | Borella et al. |
| 6,456,591 B1 | 9/2002 | Mishra |
| 6,459,811 B1 | 10/2002 | Hurst, Jr. |
| 6,542,467 B2 | 4/2003 | Umayabashi |
| 6,587,875 B1 | 7/2003 | Ogus |
| 6,590,936 B1 | 7/2003 | Kadono |
| 6,598,228 B2 | 7/2003 | Hejna |
| 6,600,720 B1 | 7/2003 | Gvozdanovic |
| 6,665,751 B1 | 12/2003 | Chen et al. |
| 6,700,869 B1 | 3/2004 | Falco et al. |
| 6,731,605 B1 * | 5/2004 | Deshpande .................. 370/252 |
| 6,741,565 B1 | 5/2004 | Wicklund |
| 6,747,991 B1 | 6/2004 | Hemy et al. |
| 6,959,448 B1 | 10/2005 | Seo |
| 6,988,144 B1 | 1/2006 | Luken et al. |
| 7,830,958 B2 * | 11/2010 | Wu et al. ............... 375/240.08 |
| 2001/0047423 A1 | 11/2001 | Shao et al. |
| 2002/0010938 A1 | 1/2002 | Zhang et al. |
| 2002/0054578 A1 | 5/2002 | Zhang et al. |
| 2002/0075857 A1 | 6/2002 | LeBlanc |
| 2002/0085587 A1 | 7/2002 | Mascolo |
| 2002/0101880 A1 | 8/2002 | Kim |
| 2002/0114393 A1 | 8/2002 | Vleeschouwer |
| 2002/0126891 A1 | 9/2002 | Osberger |
| 2002/0136298 A1 | 9/2002 | Anantharamu et al. |
| 2002/0140851 A1 | 10/2002 | Laksono |
| 2002/0169880 A1 | 11/2002 | Loguinov et al. |
| 2002/0186660 A1 | 12/2002 | Bahadiroglu |
| 2003/0016630 A1 | 1/2003 | Vega-Garcia et al. |
| 2003/0035133 A1 | 2/2003 | Berkema et al. |
| 2003/0067872 A1 | 4/2003 | Harrell et al. |
| 2003/0067877 A1 | 4/2003 | Sivakumar et al. |
| 2003/0095594 A1 | 5/2003 | Laksono et al. |
| 2003/0101274 A1 | 5/2003 | Yi et al. |
| 2003/0152032 A1 | 8/2003 | Yanagihara et al. |
| 2003/0189589 A1 | 10/2003 | LeBlanc et al. |
| 2004/0017773 A1 | 1/2004 | Piche et al. |
| 2004/0045030 A1 | 3/2004 | Reynolds et al. |
| 2004/0057381 A1 | 3/2004 | Tseng et al. |
| 2004/0062182 A1 | 4/2004 | Pietruszynski et al. |
| 2004/0062207 A1 | 4/2004 | Gross |
| 2004/0071096 A1 | 4/2004 | Na et al. |
| 2004/0086268 A1 | 5/2004 | Radha et al. |
| 2004/0153951 A1 | 8/2004 | Walker et al. |
| 2004/0170186 A1 | 9/2004 | Shao et al. |
| 2004/0190515 A1 | 9/2004 | Nogima et al. |
| 2004/0204041 A1 | 10/2004 | Fillebrown et al. |
| 2004/0252759 A1 | 12/2004 | John Winder et al. |
| 2004/0255328 A1 | 12/2004 | Baldwin et al. |
| 2005/0007956 A1 | 1/2005 | Nilsson et al. |
| 2005/0041689 A1 | 2/2005 | Wu et al. |
| 2005/0055201 A1 | 3/2005 | Florencio et al. |
| 2005/0094622 A1 | 5/2005 | Mallila |
| 2005/0105469 A1 | 5/2005 | Hao |
| 2005/0152465 A1 | 7/2005 | Maltsev et al. |
| 2005/0169174 A1 * | 8/2005 | Apostolopoulos et al. ... 370/230 |
| 2005/0195821 A1 | 9/2005 | Yun et al. |
| 2005/0213502 A1 | 9/2005 | Convertino et al. |
| 2005/0216950 A1 | 9/2005 | MacInnis |
| 2006/0045020 A1 | 3/2006 | Picco et al. |
| 2006/0077993 A1 | 4/2006 | Pereira et al. |
| 2006/0139201 A1 * | 6/2006 | Nagata et al. .................... 342/1 |
| 2006/0165166 A1 | 7/2006 | Chou et al. |
| 2006/0198392 A1 | 9/2006 | Park et al. |
| 2007/0064722 A1 | 3/2007 | Fang |
| 2007/0263657 A1 | 11/2007 | Sugar et al. |
| 2008/0117915 A1 | 5/2008 | Khirman |
| 2008/0259792 A1 | 10/2008 | Cimini et al. |

FOREIGN PATENT DOCUMENTS

| | | |
|---|---|---|
| EP | 1 047 223 A3 | 2/2001 |
| EP | 1 179 925 A2 | 2/2002 |
| EP | 0 699 368 | 7/2002 |
| EP | 1300046 | 4/2003 |
| EP | 1 179 925 A3 | 8/2003 |
| EP | 1536582 | 6/2005 |
| GB | 2 367 219 A | 3/2002 |
| JP | 6-338918 | 12/1994 |
| JP | 10-200484 | 7/1998 |
| JP | 11-215480 | 8/1999 |
| JP | 2000-308023 | 11/2000 |
| JP | 2001-223716 | 8/2001 |
| JP | 2002-58002 | 2/2002 |
| JP | 2002-94567 | 3/2002 |
| JP | 2002-217965 | 8/2002 |
| JP | 2003-008487 | 1/2003 |
| JP | 2003-32316 | 1/2003 |
| JP | 2003-37649 | 2/2003 |
| JP | 2003-204342 | 7/2003 |
| WO | WO 01/39508 | 5/2001 |
| WO | WO 02/03609 A2 | 1/2002 |
| WO | WO 02/03609 A3 | 1/2002 |
| WO | WO 02/087276 A2 | 10/2002 |
| WO | WO 02/087276 A3 | 10/2002 |
| WO | WO 02/101513 | 12/2002 |
| WO | WO 03/003630 | 1/2003 |
| WO | WO 03/009581 | 1/2003 |
| WO | WO 03/032643 | 4/2003 |
| WO | WO 03/075021 | 9/2003 |
| WO | WO 03/096698 | 11/2003 |
| WO | WO 2004/062291 | 7/2004 |

OTHER PUBLICATIONS

Draft Amendment to IEEE Std. 802.11 (1999 Edition), Part 11: MAC and PHY specifications: Medium Access Control (MAC) Quality of Service (QoS) Enhancements, IEEE P802.11e/D8.0, Feb. 2004.

Peter Van Beek, et al., "Adaptive streaming of high-quality video over wireless LANs," Visual communications and Image Processing 2004, Proc. of SPIE-IS&T Electronics Imaging, SPIE vol. 5308, 2004, pp. 647-660.

Jun Xin et al., "Bit allocation for Joint Transcoding of Multiple MPEG Coded Video Streams," Department of Electrical Engineering, University of Washington, Box 352500, Seattle, WA 98195, 4 pages, date unknown.

Limin Wang and Andre Vincent, "Bit allocation and Contraints for Joint Coding of Multiple Video Programs," IEEE Transactions on Circuits and Systems for video Technology, vol. 9, No. 6, Sep. 1999, pp. 949-959.

Sergio D. Servetto and Klara Nahrstedt, "Broadcast Quality video over IP," IEEE Transactions on Multimedia, vol. 3, No. 1, Mar. 2001, pp. 162-173.

Bernd Girod and Niko Farber, "Chapter 12: Wireless Video," Compressed video Over Networks, Nov. 14, 1999, Telecommunications laboratory, University of Erlangen-Nuremberg, Cauerstrasse 7, 91058 Erlangen, Germany, pp. 1-38.

(56) References Cited

OTHER PUBLICATIONS

Amy R. Reibman and Barry G. Haskell, "Constraints on Variable Bit-Rate Video for ATM Networks," IEEE Transactions on circuits and Systems for Video Technology, vol. 2, No. 4, Dec. 1992, pp. 361-372.

Arunchandar Vasan and A. Udaya Shankar, "An Empirical Characterization of Instantaneous Throughput in 802.11b WLANs," Department of computer Science and UMIACS, University of Mayland, college Park, MD 20742, 6 pages.

Jean-Chrysostome Bolot and Thierry Turletti, "A rate control mechanism for packet video in the Internet," INRIA, B. P. 93, 06902 Sophia-Antipolis Cedex, France, 8 pages.

Vern Paxson, "End-to-End Internet Packet Dynamics," Network Research Group, Lawrence Berkeley National laboratory, University of California, Berkeley, Jun. 23, 1997, 17 pages.

J-C Bolot and T. Turletti, "Experience with Control Mechanisms for Packet Video in the Internet," INRIA, 2004, route des Lucioles, 06902 Sophia Antipolis Cedex, France, 12 pages, date unknown.

Daji Qiao, et al., "Goodput Analysis and Link Adaptation for IEEE 802.11a Wireless LANs," IEEE Transactions on Mobile Computing, vol. 1, No. 4, Oct.-Dec. 2002, pp. 278-292.

Steve Gardner, et al., "HomePlug Standard Brings Networking to the Home," CSD Dec. 2000: Feature: HomePlug Standard Brings Networking to the Home, http://www.commsdesign.com/main/2000/12/0012feat5.htm, 9 pages.

Bob O'Hara and Al Petrick, "IEEE 802.11 Handbook: A Designer's Companion," Published by Standards Information Network, IEEE Press, The Institute of Electrical and Electronics Engineers, Inc., 174 pages. Copyright 2001.

Draft "Test Model 5," Test Model Editing Committee, ISO-IEC/JTC1/SC29/WG11/N0400, Coded Representation of Picture and Audio Information, Apr. 1993, Telecommunication Standardization Sector Study Group 15, Experts Group for ATM video Coding.

James C. Chen, Ph.D., Measured Performance of 5-GHz 802.11a Wireless LAN Systems, Aug. 27, 2001, Atheros Communications, Inc., 11 pages.

Kevin Lai and Mary Baker, "Measuring Bandwidth," Jul. 15, 1998, 25 pages, laik@cs.stanford,edu and mgbaker@cs.stanford.edu.

Chi-Yuan Hsu, et al., "Rate Control for Robust Video Transmission over Burst-Error Wireless Channels," IEEE Journal on Selected Areas in Communications, vol. 17, No. 5, May 1999, pp. 1-18.

Philip A. Chou and Zhourong Miao, "Rate-Distortion Optimized Streaming of Packetized Media," Submitted to IEEE Transactions on Multimedia, Feb. 2001, pp. 1-20.

Dmitri Loguinov and Hayder Radha, "Video Receiver Based Real-Time Estimation of channel Capacity," IEEE ICIP 2002, pp. III-213-III-216.

Wendell Smith, "Wireless Video White Paper," ViXS Systems Inc., ViXS Confidential, Jan. 9, 2002, 15 pages.

James F. Kurose and Keith W. Ross, "Computer Networking: A Top-Down Approach Featuring the Internet," Copyright 2001 by Addison Wesley Longman, Inc.

M. Kalman, E. Steinbach, and B. Girod, "Adaptive Media Playout for Low-Delay video Streaming Over Error-Prone Channels," IEEE Transactions on Circuits and Systems for Video Technology, vol. 14, No. 6, Jun. 2004, pp. 841-851.

R. Ramjee, J. Kurose, D. Towsley, and H. Schulzrinne, "Adaptive Playout Mechanisms for Packetized Audio Applications in Wide-Area Networks," IEEE Infocom, Toronto, Canada, Jun. 1994, 9 pages.

M. Kalman, E. Steinbach, and B. Girod, "Adaptive Playout for Real-Time Media Streaming," Proc. IEEE International Symposium on Circuits and Systems, ISCAS-2002, Scottsdale, AZ, May 2002, 4 pages.

International Search Report for PCT/US 06/36433 mailed Apr. 27, 2007.

M. Kalman, B. Giron and P. Van Beek, "Optimized transcoding rate selection and packet scheduling for transmitting multiple video streams over a shared channel," IEEE Int. Conference on Image Processing (ICIP 2005), Genova, Italy, Sep. 2005, 4 pages.

K. Stuhlmuller, N. Farber, M. Link and B. Girod, "Analysis of video transmission over lossy channels," IEEE Journal on Selected Areas in Communications, vol. 18, No. 6, Jun. 2000, pp. 1012-1032.

S. Aramvith, I-M. Pao and M.-T. Sun, "A rate control scheme for video transport over wireless channels," IEEE Trans. on Circuits and Systems for Video Technology, vol. 11, No. 5, May 2001.

\* cited by examiner

| 1 | 4 | 2 | 3 | 7 | 5 | 6 | 10 | 8 | 9 | 13 | 11 | 12 | 15 | 14 |
|---|---|---|---|---|---|---|----|---|---|----|----|----|----|----|
| I | P | B | B | P | B | B | P  | B | B | P  | B  | B  | P  | B  |
| 14| 1 | 6 | 13| 2 | 7 | 12| 3  | 8 | 11| 4  | 9  | 10 | 5  |    |

Example of the order of omitted frames within a GOP. The frames are shown in encoding order, the numbers above each frame indicate the display order. The numbers below each frame indicate the order in which each frame will be omitted. In this example, omission pattern $o_1$ involves drop one B frame (Frame 2 in display order), $o_2$ drops two B frames (Frames 2 and 5, in display order), and so on.

FIG. 4

Tradeoff between rate and distortion/quality per GOP for a video test sequence, encoded at 8.0 Mbps using H.264/AVC, over a set of pre-determined omission patterns.

FIG. 5

DISTRIBUTED CHANNEL TIME ALLOCATION FOR VIDEO STREAMING OVER WIRELESS NETWORKS

CROSS-REFERENCE TO RELATED APPLICATIONS

This application claims the benefit of U.S. Provisional App. No. 60/845,582, filed Sep. 18, 2006.

BACKGROUND OF THE INVENTION

The present invention relates generally to wireless transmission systems, and relates more particularly to distributed channel time allocation and rate adaptation for multiple user video streaming.

Developing enhanced television systems is a significant consideration for consumer electronics manufacturers. In conventional television systems, a display device may be utilized to view program information received from a program source. The conventional display device is typically positioned in a stationary location because of restrictions imposed by various physical connections coupling the display device to input devices, output devices, and operating power. Other considerations such as display size and display weight may also significantly restrict viewer mobility in traditional television systems.

Portable television displays may advantageously provide viewers with additional flexibility when choosing an appropriate viewing location. For example, in a home environment, a portable television may readily be relocated to view programming at various remote locations throughout the home. A user may thus flexibly view television programming, even while performing other tasks in locations that are remote from a stationary display device.

Furthermore, a significant proliferation in the number of potential program sources (both analog and digital) available may benefit a system user by providing an abundance of program material for selective viewing. Examples of video sources include satellite and cable television transmission, terrestrial television broadcasts, digital video disks (DVD), video cassette recorders (VCR), digital video recorders (DVR), personal computers (PC) and the Internet. Video material may be available in either a live manner, for example from live broadcasts or live Internet video streaming, or in a stored manner, such as from video recorders or Internet downloads. In particular, an economical wireless audio/video transmission system for flexible home use may enable television viewers to significantly improve their television-viewing experience by facilitating portability while simultaneously providing an increased number of program source selections. The ease of installation of wireless home networks is another major benefit compared to wired home networks.

The evolution of digital data network technology and wireless digital transmission techniques may provide additional flexibility and increased quality to television systems in the home. However, current wireless data networks typically are not optimized for transmission of high quality video information.

High quality continuous media streams, such as video image streams, in their raw form often require high transmission rates, or bandwidth, for effective and/or timely transmission. In many cases, the cost and/or effort of providing the required transmission rate is prohibitive. This transmission rate problem is often solved by compression schemes that take advantage of the continuity in content to create highly packed data. Compression methods for audio and video such as based on ISO Motion Picture Experts Group (MPEG) standards, ITU standards and their variants are well known. With high resolution video, such as the resolutions of 720p, 1080i, or 1080p, used in high definition television (HDTV), the data transmission rate of such a video image stream will be very high even after compression.

It may be difficult to transmit continuous media in networks with a limited bandwidth or capacity. For example, in a local area network with multiple receiving/output devices, such a network will often have a limited bandwidth or capacity, and hence be physically and/or logistically incapable of simultaneously supporting multiple receiving/output devices. Furthermore, the available bandwidth of wireless interconnections and networks often varies over time and is unpredictable due to several factors.

Transmission of compressed media data over such networks is difficult, because a high bandwidth is required continuously, and because of the stringent delay constraints associated with continuous media streams. Degradation of the channel condition may result in data packets being lost or delayed, leading to distortions or interruptions of the media presentation.

In some cases for video an ad hoc wireless network is a collection of wireless nodes which communicate with each other without the assistance of fixed infrastructure. In some cases, these wireless nodes may be configured as a wireless mesh network. Each node may be a source, a destination, and/or a relay for traffic. Wireless links between nodes are established when needed for transmission of data. Since the installation of such a network is fast and flexible because the nodes may be located at suitable locations and merely turned on, it is useful to support real-time media streaming over such an ad hoc network. However, in such ad hoc networks the limited power resources and bandwidth limitations of the wireless nodes, combined with the demanding rate and delay requirements of video streaming, impose limitations that are not typical of conventional data networking. In particular, rate allocation, scheduling, and routing of the video packets should be done in such a manner for efficient utilization of the network resources without overwhelming any individual wireless link.

When multiple video streams are present in the network, they share and compete for the common resources such as transmission power and media access. The shared wireless channel is subject to interference from other transmitters, multi-path fading and shadowing, causing fluctuations in link capacities and transmission errors. Also, the traffic patterns of compressed media streams typically change over time due to content variations and dynamic user behavior, the received media quality may be degraded due to packet losses, and error propagation may occur in the compressed bit stream. Further, media streaming applications usually have high data rate and stringent latency requirements, which is at odds with the limited bandwidth recourses in a wireless network. Rate allocation among various media streams serves the purpose of resource allocation among the video streams. In general, a transmitter at a high video source rate utilizes more network resources and achieves better quality of the transmitted video. The rate allocated for a particular video stream determines the distortion of that video stream. Moreover, the rate-distortion tradeoff for different video streams are usually different, hence it is preferable to allocate rates to the video streams in a manner that considers this tradeoff. In general, the rate allocation technique should achieve a fair and efficient resource allocation among the video streams using the ad hoc network. It is also desirable to have a distributed technique so that the computational burden is shared among the participating nodes to reduce the computations requirements of any particular node.

For multi-user video streaming over ad hoc wireless networks, one technique is to use a centralized scheme for minimizing the total video distortion under a total rate constraint for the network. While such a centralized approach suits well for some applications, such as surveillance video with a common receiver, it introduces significant additional overhead due to the need for collection of information at the central decision node as well as the need to communicate the decisions taken at the central node to all other nodes.

It is desirable to have distributed channel time allocation that adapts the rate for multiple users of a wireless network.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
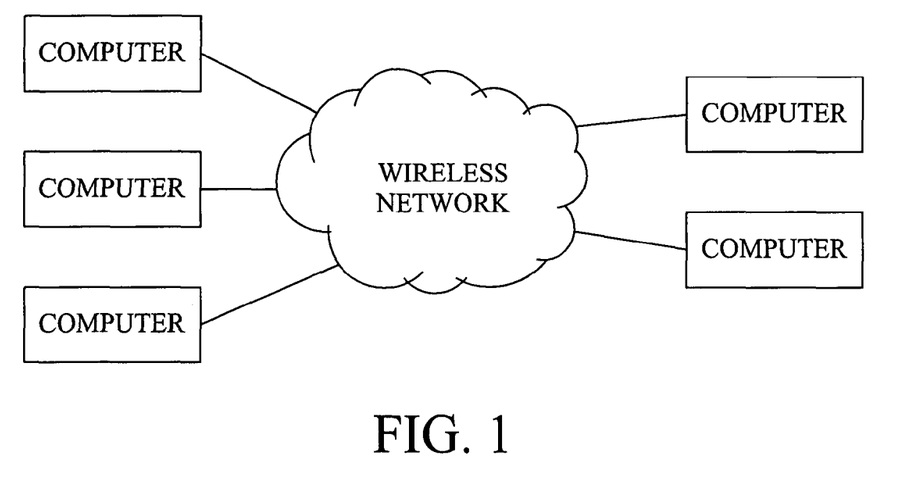
FIG. 1 illustrates a wireless network.

FIG. 1 illustrates a system for transmission of multiple data streams across a wireless network that may have limited bandwidth. The system includes a plurality of computers (e.g., a transmitter and/or receiver) 210, 220, 230, 240, 250 joined together by a wireless network 260. Each of the computers may include a transmitter and/or a receiver, or may be comprised of only a transmitter and/or receiver. The input video streams may be stored on a media server, one or more of the computers, or arrive from an external source, such as a satellite television transmission, a digital video disc player, a video cassette recorder, or a cable head end. The video streams can include display data, graphics data, digital data, analog data, multimedia data, audio data and the like.

Figure 2:
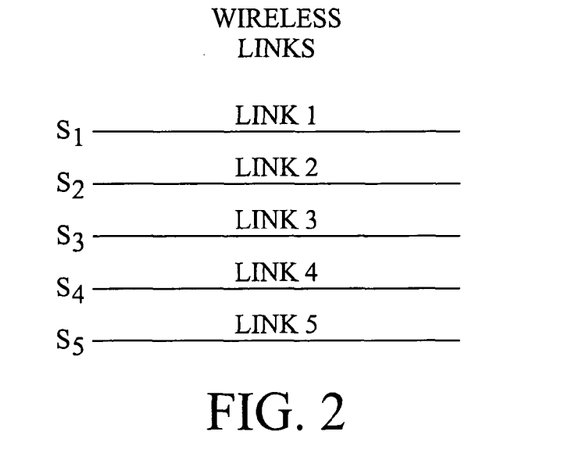
FIG. 2 illustrates wireless links.

Referring to FIG. 2, when N video streams are present over the common wireless network, each is transmitted over a wireless link from one node to another node, where each wireless link has a capacity for transmission or effective bandwidth $C_i$ (in bits per second). Each stream is assigned a proportion of channel time $s_i$, resulting in effective transmission rate $R_i = s_i C_i$, leading to average distortion $D_i(R_i)$ of the transmitted video stream. It is noted that there is a different distortion-rate trade-off D(R) associated with each particular video stream. The distortion-rate relationship for a particular stream $D_i(R_i)$ may be available in several different forms. In some cases, this relationship may be in analytical form. In some cases, only a discrete set of distortion-rate pairs may be available, for example $D_{i,k}(R_{i,k})$ with k=1 ... K for stream i. To maintain a good overall quality of all received video streams in the system, optimization of channel time allocation can be formulated as follows:

$$\min_{s_i} \sum_i D_i(R_i) = \min_{s_i} \sum_i D_i(s_i C_i) \qquad (1)$$

$$s.t. \sum_i s_i < \gamma$$

$$0 < s_i < \gamma,$$

$$i = 1, \ldots, N$$

where $\gamma < 1.0$ is a provisioning factor to prevent overloading the network. The first equation seeks to minimize the distortion over all the video streams i. The second equation seeks to impose a constraint that the time permitted for all of the streams is less than 1, namely, less than all of the time. Thus the system attempts to optimize the quality for all of the different video streams by allocation of time for each stream.

For simplicity, the optimization may be performed for continuous values of $s_i$'s, and the distortion for $R_{i,k} < s_i C_i < R_{i,k+1}$ may be obtained via linear interpolation between two available discrete rate points. Note that for convex distortion-rate functions (including a piecewise linear model), the problem has a convex objective function and linear constraints, thus can be solved readily in a centralized manner using existing optimization techniques.

It is desirable to do the optimization of the transmission of the video streams in a distributed manner among the various transmitters. By using a distributed optimization technique, the system reduces the computation burden on a particular node by being shared among many nodes. Also, the distributed optimization technique reduces the overhead of transmitting all of the needed information to a central server, and increases the robustness against failure of the central node.

The distributed optimization may be achieved using any suitable distributed technique, such as for example (1) a so-called primal decomposition of the optimization problem among the users, and (2) a so-called dual decomposition based on maximizing the dual function of the objective in equation 1.

In the primal decomposition approach, each user updates its allocated time separately, along the gradient of the cost function with respect to its own variable $s_i$ which is the time to allocate to a particular video stream:

$$s_i := s_i - \mu \frac{dD_i}{ds_i} = s_i - \mu C_i D'_i(s_i C_i), \qquad (2)$$

where $$\frac{dD_i}{ds_i}$$

is the slope of distortion reduction caused by rate reduction, which is different for each video stream i. The scaling factor $\mu$ decreases over time to guarantee convergence. Thus the channel time for a particular stream is adjusted based upon its current value and the cost function. The slope $$\frac{dD_i}{ds_i}$$

may be characterized by $D'_i(R_i) = D'_i(s_i C_i)$.

After each or selected update of the variable $s_i$, each of the nodes should send out its current $s_i$ value either in a separate packet or within a video packet to all of the other nodes. While many of the other nodes may not be the destination node of a particular packet, the other nodes will still sense the packet and thus may extract the information from it. After each update (or selected updates), the allocation is confined within the range of $0 \leq s \leq \gamma$. If the total allocated time exceeds the constraint $\gamma$, each transmitter should back up accordingly:

$$s_i := s_i - \Delta/n = s_i - \left(\sum_{i'} s_{i'} - \gamma\right)/n. \quad (3)$$

$$\text{where } \Delta = \sum_{i'} s_{i'} - \gamma$$

is the excess in channel time allocation and n is the total number of users in the network. This corresponds to iteratively projecting the variable vector s back into the constrained convex set.

In the dual decomposition approach, instead of minimizing the primal problem, the system may instead maximize the corresponding dual problem, by incorporating the linear constraints into the cost function:

$$\max_{\lambda} L(\lambda) = \sum_i g_i(\lambda) - \lambda \gamma, \quad (4)$$

where $$g_i(\lambda) = \min_{s_i} [D_i(s_i C_i) + \lambda s_i] \quad (5)$$

is optimized independently at each user, given $\lambda$. It is desirable to increase $s_i$ of $D_i(s_i C_i)$ in order to minimize the distortion, which increases the data rate. Likewise it is desirable to decrease $s_i$ of $\lambda s_i$ in order to minimize the share of channel time taken (to avoid violating the channel time constraint). Accordingly, there is balance that minimizes the overall function. The use of $\lambda$ shifts the balance of the minimization point, where $\lambda$ is a value shared among all the nodes, which is transmitted among the nodes in packets.

Optimization of $\lambda$, in turn, is achieved by descending along the gradient of the dual cost function:

$$\lambda := \lambda - \mu\left(\gamma - \sum_{i'} s_{i'}\right). \quad (6)$$

The update step size is modulated by a scaling factor $\mu$ that decreases over time, and is proportional to the excess of total allocated channel time with respect to the constraint. The scaling factor $\mu$ could, for example, decrease with the iteration count or with an elapsed time. Using an elapsed time would decrease the need to share the iteration count among the nodes in the video packets which decreases the bandwidth used. Intuitively, the dual variable $\lambda$ can be understood as a shadow price that helps to regulate the channel time allocation: if the total channel time exceeds the limit $\gamma$, the price increases accordingly, resulting in reduced $s_i$ for each stream to minimize $g_i(\lambda)$.

Figure 3A:
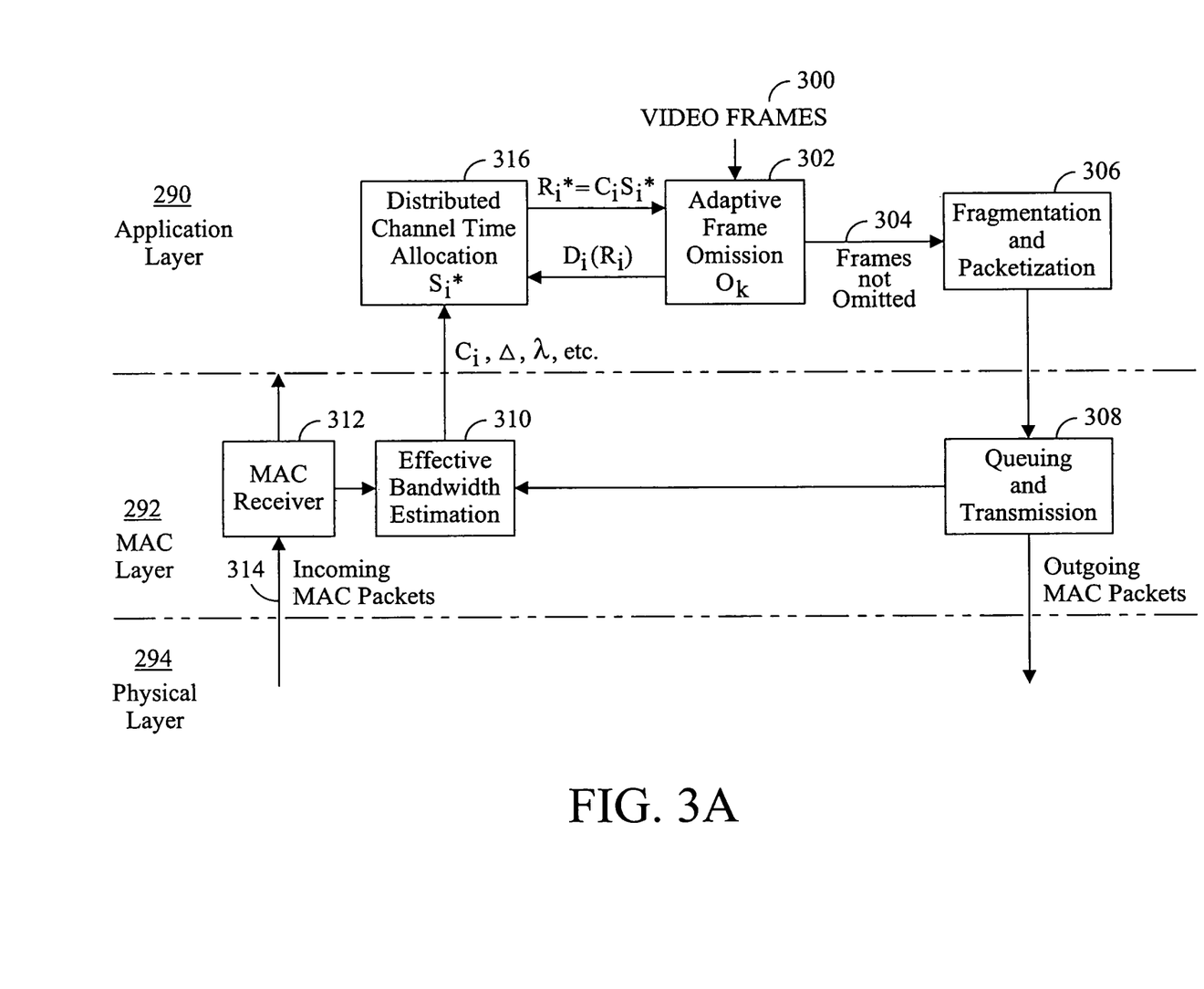
FIG. 3A illustrates a frame based wireless node with the application layer, MAC layer, and physical layer.
Figure 3B:
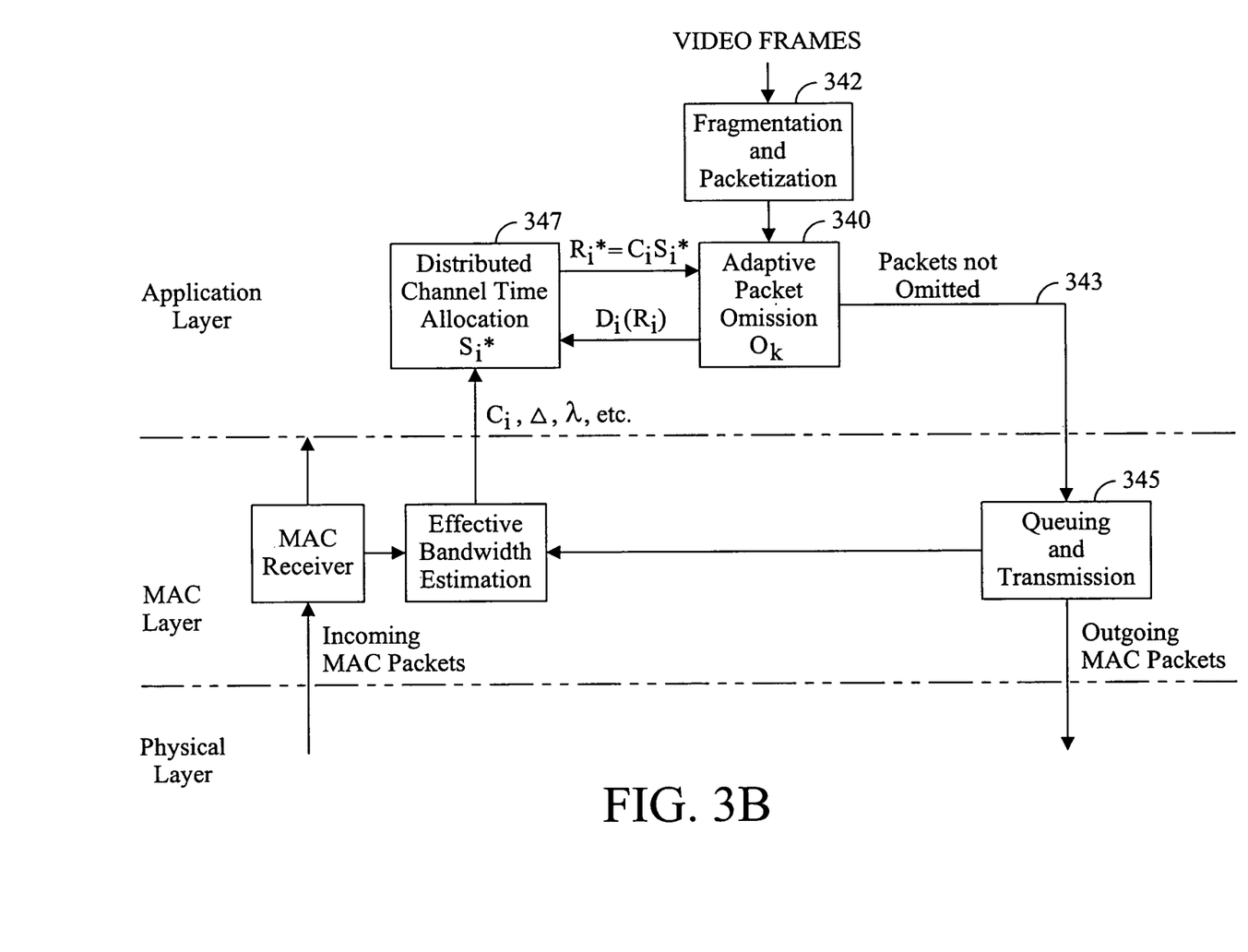
FIG. 3B illustrates a packet based wireless node with the application layer, MAC layer, and physical layer.

It may be observed that these techniques attempt to find a target bit rate by solving the joint rate allocation in a distributed manner. The allocation is based upon the distortion with the channel time being a constraint. Both the primal and dual decomposition techniques are preferably implemented as distributed optimization protocols at the application and MAC layer of the wireless nodes. In addition, a wireless node transmitting video may perform adaptation of the video stream itself in order to conform to the optimal target bit rate for that stream. Adaptation of a video stream may be performed by selectively omitting (dropping) packets or frames from the stream before transmission. Other rate adaptation techniques may be used instead of, or in combination with, such a packet and frame omission technique. An overview of exemplary system structures is illustrated in FIG. 3A and FIG. 3B which show the various functional modules at each wireless node. In general, the channel time allocation optimization is performed at the application layer as well as adaptation of the video stream. Whereas the MAC layer is in charge of estimating effective bandwidth of the channel by logging arrival and departure events of both data and control packets over time. Also, the system may estimate the bandwidth in other manners, such as not using information from the MAC layer.

Referring to FIG. 3A, a set of video frames 300 are received by an adaptive frame omission process 302 in an application layer 290. The adaptive frame omission process 302 reduces the data by selectively removing frames of video from the data stream according to a frame omission pattern Ok, described later. The remaining frames of the video without the omitted frames 304 are passed to a fragmentation and packetization process 306. The packets resulting from the fragmentation and packetization process 306 are provided to a MAC layer 292. A queuing and transmission process 308 receives the data from the fragmentation and packetization process 306. The queuing and transmission process 308 queues the data and provides the data to a physical layer 294. The queuing and transmission process 308 may also provide information to an effective bandwidth estimation process 310. The physical layer 294 provides incoming MAC packets 314 to a MAC receiver 312. The MAC receiver 312 provides received MAC packets to the application layer 290. The MAC receiver 312 also provides information to the effective bandwidth estimation and packet monitoring process 310. The effective bandwidth estimate and packet monitoring process 310 determines values such as the effective bandwidth or capacity $C_i$, and may extract the values of optimization parameters $\lambda$, and $\Delta$ from packets received. These values are provided to the channel time allocation optimization process 316. A distributed channel time allocation process 316 determines the optimal amount of time $s_i^*$ to allocate to the particular stream which is then provided to the adaptive frame omission process 302. For each group of pictures of incoming video frames 300, the rate-distortion tradeoff $D_{i,k}(R_{i,k})$ for each omission pattern $o_k$, k=1, . . . , K is updated based on offline or online computation, to be described. This information, together with the effective channel bandwidth $C_i$ reported from the MAC layer, is used for updating the allocated channel time $s_i$ according to equations 2 and 3 in the primal decomposition scheme, and according to equations 4, 5, and 6 in the dual decomposition scheme. Note that in the primal decomposition scheme each user may also maintain the excess of total channel time $$\Delta = \sum_{i'} s_{i'} - \gamma \text{ by}$$

extracting the channel time allocation information $s_j$, $j \neq i$ from data packets transmitted by other users. Likewise, each user may maintain a common shadow price $\lambda$ in the case of the dual decomposition scheme. In order to synchronize the update step sizes at all users, only the values of $\lambda$ and $\Delta$ as reported by the stream with the smallest flow ID are used for update at each node. The iterative technique is considered to converge when the variations between the previous and newly computed allocated channel time is observed to be smaller than a given threshold. In that case, the optimal allocation $s_i^*$ is used to guide the adaptive frame omission process, to find the omission pattern that meets the target rate $R_i^*=C_i s_i^*$. According to the omission pattern, only a subset of the encoded frames in the group of frames are fragmented into multiple packets and passed along to the MAC layer for transmission over the wireless link.

Effective bandwidth $C_i$ is calculated where the average payload size and total transmission time needed for each application-layer packet are estimated by recording packet arrival and departures at the MAC layer. Note that, in each wireless node, the MAC layer may pass along video packets of all streams to the application layer, so as to allow extraction of reported channel time allocation and shadow prices from other users.

Another system structure may be based on omitting individual packets, rather than entire video frames. Note that a single compressed video frame may be encapsulated by one or multiple packets. In case of high bit rate streams, such as streams carrying SD or HD television content, a single frame corresponds often corresponds to multiple packets. Hence, adaptive transmission and omission of individual packets results in a fine-grained video adaptation system. Referring to FIG. 3B, the system utilizes an adaptive packet omission process 340 (instead of an adaptive frame omission process). A fragmentation and packetization process 342 receives video frames 300. The video packets resulting from process 342 are provided to the adaptive packet omission process 340. The adaptive packet omission process 340 reduces the data by selectively removing packets of video from the data stream according to a packet omission pattern $o_k$, described later. The remaining packets of the video stream without the omitted packets 343 are passed to the queuing and transmission process 345. Other processes are relatively unchanged compared to FIG. 3A. Note that the distortion-rate tradeoff data $D_{i,k}(R_{i,k})$ provided to the distributed channel time allocation process 347 in FIG. 3.B correspond to the rate and distortion values resulting from packet omission patterns. The optimal allocation $s_i^*$ computed by the channel time allocation process 347 is used to guide the adaptive packet omission process 340.

Each wireless node maintains and updates a set of local observations for its video and channel state, and extracts from other users' video packet headers several variables to perform the distributed optimization. These are summarized in Tables I and II. These data tables include fields for both the primal and dual techniques. In practice, only a subset of these fields may be utilized, depending on the implementation.

TABLE I

List of local variables maintained and updated by each user

| | |
|---|---|
| channel_rate_ | effective channel rate reported by the MAC layer |
| rate_array_[ ], dist_array_[ ]: | RD tradeoff points of the current group of pictures |
| mu_ | Scaling factor of the step sizes in updating $s_i$ and $\lambda$ according to Eq. (4) or (7). It decreases nonlinearly with the number of iterations, so as to guarantee convergence. |
| price_ | shadow price $\lambda$ for the dual decomposition approach |
| virtual_time_ | allocated channel time proportion $s_i$ during optimization |
| allocated_rate_ | allocated rate $R_i^* = s_i^* C_i$, updated only when channel time allocation converges |

TABLE II

List of variables extracted from other users' packet headers

| | |
|---|---|
| Flowid_per_user_[ ]: | flow ID of all video streams present in the network. |
| iter_per_user_[ ]: | iteration step number, for synchronizing update step size at each user |
| price_per_user_[ ] | shadow price $\lambda$ for dual optimization |
| time_per_user_[ ] | allocated channel time reported by each user |
| timestamp_per_user_[ ] | timestamp of recorded entry, for detecting expiration of existing streams |

The optimization procedures may be implemented in the functions listed in Table III. Note that these procedures can be invoked either at the sender or the receiver side of the video streaming session. In the sender-driven case, the source node estimates the rate-distortion tradeoff of the encoded video stream for each group of pictures, performs the optimization using functions update_rate_primal or update_rate_dual, and announces the allocate channel time in the header of video packets. In the receiver-driven case, the optimization is performed at the destination node, whereas the sender embeds the rate distortion tradeoff information of the video stream in the header of video packets, and extracts the allocated time decision piggybacked in the application-layer acknowledgment packet headers.

TABLE III

Functions performing the primal and dual optimization at each node.

| | |
|---|---|
| update_rate_primal( ) | update allocated time and rate according to Equation 2, then re-project the allocation back into the constrained space according to Equation 3. |
| update_rate_dual( ) | update allocated time and rate according to Equation 5 |
| record_from_other_user( ) | invoked upon receiving/overhearing a video packet at the MAC layer, records flow id, iteration number, price and time allocation information, etc. of the other stream. In case of the dual decomposition algorithm, also updates the shadow price $\lambda$ according to Equation 4. |

The bandwidth estimates (e.g., the capacity of the channel) may be calculated in any suitable manner. In some implementations the protocol may use a cross-layer information exchange between the MAC and application layers. By way of illustration, a wireless link is formed by communication between a pair of wireless nodes. Although the wireless media is shared by all nodes, different wireless links may experience different channel conditions, thus have different effective bandwidths. The effective bandwidth for one user denoted by "i" is affected by random losses due to transmission errors over the wireless link, and can be roughly estimated as:

$$C_i = \frac{\overline{B}_i}{\overline{T}_i},$$

where $\overline{B}_i$ denotes the average size of the packets transmitted over the link and $\overline{T}_i$ denotes the expected transmission time of each packet, including MAC/PHY protocol overhead and re-transmissions. The value of $\overline{T}_i$ primarily depends on the packet error rate (PER) over the wireless link, and can be dynamically monitored using many techniques, such as, by logging packet arrival and departure events at the MAC layer. The process may also include filtering or smoothing of the estimates in sequential manner. In that case, the effective channel bandwidth Ci for stream i may be measured as:

$$C_i = \alpha C_i^{prev} + (1 - \alpha)\frac{\overline{B}_i}{\overline{T}_i}$$

by logging average packet payload size $\overline{B}_i$ and average delivery time $\overline{T}_i$ at the MAC layer, including the overhead of header and ACK transmissions, as well as retransmissions in the case of packet losses on the physical channel. $C_i^{prev}$ denotes the previous estimate. A smoothing factor $\alpha$ may be chosen to be 0.95.

The selection of packets or frames to omit may be determined in any suitable manner. A frame omission pattern corresponds to a series of decisions to either transmit or omit particular frames from the set of frames comprising a group of frames. Likewise, a packet omission pattern corresponds to a series of decisions to either transmit or omit particular packets from the set of packets comprising a group of frames. Potentially, a very large number of different candidate frame or packet omission patterns may exist. To reduce complexity in terms of computational burden as well as storage requirements, it is desirable to reduce the number of frame or packet omission patterns that the system considers. For this reason, the system may employ heuristic techniques when determining how packets and frames can be omitted from a coded video stream. The different frames of the encoded video sequence, such as I, P, and B frames, have a different effect on the resulting video quality if they are omitted. In addition, the order in which the same or different type of frames are omitted also has an impact on the resulting video quality. Moreover, it was also determined that depending on the particular video encoding scheme different sequences of frames may be used to transmit the frames of video, which may be characterized to determined how to best omit frames of the video. It is noted that an I frame is encoded as a single image, with no reference to any past or future frames; a P frame is encoded relative to a single reference frame, a B frame is encoded relative to one or two reference frames. Such different encoding types and techniques result in dependencies between the compressed video frames. The frame encoding types and frame dependencies are considered when selecting frames and packets to be omitted.

In order to estimate the distortion for a particular video rate (i.e., decrease in video image quality) when dropping particular packets or frames of a video sequence, such as a group of pictures, a calculation or a measurement may be performed on line or off line. For example, the distortion data may be already calculated for an entire video stream. For example, the distortion information may be calculated in a live manner or otherwise be based upon a model that includes a set of parameters. The parameters may include, for example, type of frames, number of bits, etc. The distortion-rate tradeoff of each video stream i for a given group of frames l is obtained by dropping encoded video frames or packets according to pre-determined omission patterns. For each omission pattern $o_k$, the rate $R_k$ is calculated by summing over all transmitted encoded packet sizes:

$$R_k = \frac{1}{T_l}\sum_{k' \notin o_k} B_{k'} \qquad (2)$$

where $T_l$ denotes time duration of one group of pictures, and where $B_{k'}$ is the size (in bits) of a packet that is not omitted. Distortion $D_k$ for omission pattern $o_k$ may be an empirical mean-squared-error that results from decoding the video sequence while omitting the packets according to $o_k$. By varying over different omission patterns, a collection of rate-distortion tradeoff points $\{(R_1, D_1), (R_2, D_2) \ldots (R_K, D_K)\}$ can be obtained, which may be dynamically updated for each group of pictures of each sequence during the optimization.

Figure 4:
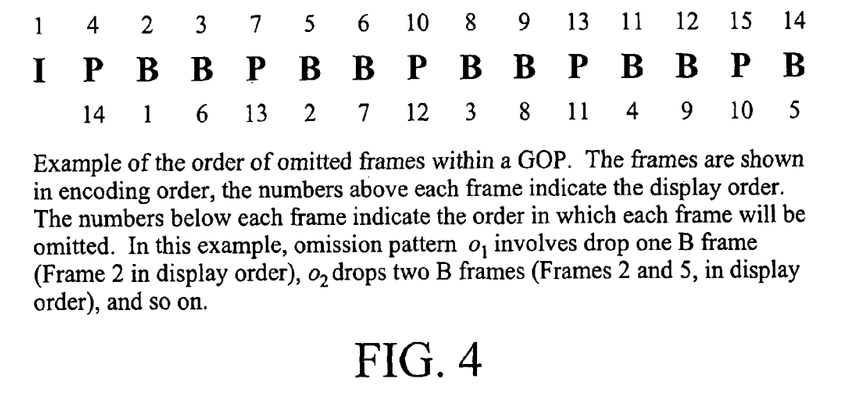
FIG. 4 illustrates omitted frames within a group of frames.

Referring to FIG. 4, one may consider a group of pictures structure of IBBPBBPBB frames as commonly used in encoded video streams, and assume previous-frame concealment at the decoder. The omission patterns may correspond to successively dropping every other B frame, which tends to minimize the visual impact of reduced frame rate, followed by dropping in the same order the rest of the B frames. Further rate reduction may be achieved by omitting P frames starting from the end of the group of pictures. FIG. 4 illustrates such a frame omission technique for a group of pictures of 15 frames. For example, the first B frame may not have other frames dependent thereon so it is a good choice to be removed first. The third, fifth, and seventh B frames likewise may not have other frames dependent thereon so it is a good choice to be removed second, third, and fourth. Next, the remaining B frames are removed in a suitable order. Then the P frames, which tend to form the references for coding the removed B frames are removed from the end going backward since each may have been coded using a previous one as reference. The selecting mechanism may be varied based upon the particular relation between the frames and the particular encoding scheme, such as MPEG-2 and MPEG-4. It is noted that in particular, MPEG-4 part 10 (AVC/H.264) permits B frames to be reference frames for other B frames, and allows a hierarchical B frame structure.

Figure 5:
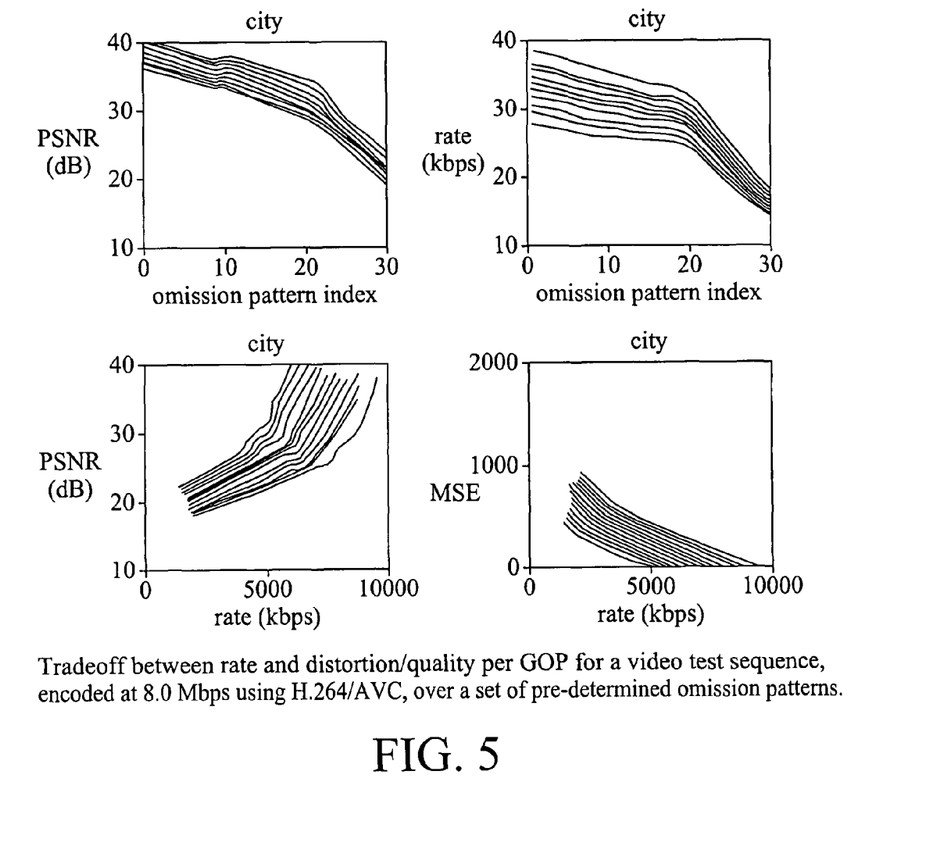
FIG. 5 illustrates the tradeoff between rate and distortion on a group of frames basis.

The resulting rate-distortion tradeoff from such a scheme is shown in FIG. 5 for a test video sequence, encoded with H.264/AVC. The group of pictures length is 30 frames, corresponding to 0.5 seconds of duration. The different curves represent different group of pictures in the sequence. A similar behavior of the rate-distortion tradeoff occurs generally in standard definition (SD) high definition (HD) video sequences.

Another video adaptation technique may be based upon dropping particular packets of particular frames in a suitable order. Heuristic pruning techniques based upon the distortion contribution of individual packets may be used to select suitable packets to drop in a particular order. Also, the packet pruning may be based upon the type of the frame each packet belongs to.

For example, the scheme may include pruning packets according to their individual distortion contributions, regardless of frame type.

For example, the scheme may include pruning based upon the omission patterns such as, packets from every other B frame, starting from the head of each group of pictures, followed by packets in the remaining B frames, and finally those from P frames, starting from the end of the group of pictures. Within each frame, packets of smaller distortion contributions may be dropped first.

For example, packets may be dropped according to the frame type to which they belong, such as, packets from every other B frame, starting from the head of each group of pictures, followed by packets in the remaining B frames, and finally those from P frames, starting from the end of the group of pictures. Within each frame, packets are pruned starting from the end of each encoded frame.

Note that other types of rate adaptation schemes, such as trans-coding, scalable coding, packet pruning, or switching between different versions of pre-encoded streams may also be used to achieve a different set of rate-distortion tradeoff points.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A system for transmitting video from a plurality of transmitters to a plurality of receivers over a shared wireless channel comprising:
   (a) said plurality of transmitters each receiving a respective video stream to transmit over said shared wireless channel;
   (b) distortion-related information associated with each of said respective video streams;
   (c) each of said plurality of transmitters having access to said distortion-related information for said respective video stream while not having access to said distortion-related information for other said video streams;
   (d) each of said plurality of transmitters separately using said respective distortion-related information of said respective said video stream to determine how to modify a proportion of the available said shared wireless channel time for transmission based upon a channel time constraint and upon a cost function that includes a scaling factor, wherein the scaling factor continuously decreases over time.

2. The system of claim 1 wherein said modification is not based upon an overall bit rate.

3. The system of claim 1 wherein said modification of said video stream is determined in a distributed manner.

4. The system of claim 1 wherein said separate determination by each of said transmitters achieves a minimum overall distortion associated with said plurality of video streams.

5. The system of claim 1 wherein said proportion of the available channel is communicated among said transmitters.

6. The system of claim 1 wherein said proportion is based upon a gradient of a cost function.

7. The system of claim 1 wherein said proportion is based upon optimizing a dual cost function.

8. The system of claim 1 wherein each transmission from a transmitter to a receiver is associated with an effective bandwidth.

9. The system of claim 8 wherein each of said plurality of transmitters has access to said effective bandwidth associated with a transmission from said respective transmitter while not having access to the effective bandwidth associated with transmissions from other transmitters.

10. The system of claim 8 wherein each of said plurality of said transmitters estimates the effective bandwidth available for transmission of a respective video stream over said shared wireless channel.

11. The system of claim 1 wherein said modification of said video stream is based upon cross layer information between a MAC layer and an application layer.

12. The system of claim 1 wherein said system includes an adaptive frame omission process.

13. The system of claim 1 wherein said each transmitter includes an adaptive frame omission process to modify said video stream.

14. The system of claim 1 wherein said system includes an adaptive packet omission process.

15. The system of claim 1 wherein said each transmitter includes an adaptive packet omission process to modify said video stream.

16. The system of claim 12 wherein said frame omission process is based upon selective omitting ones of I frames, B frames, and P frames.

17. The system of claim 14 wherein said packet omission process is based upon selective omitting packets of I frames, B frames, and P frames.

18. The system of claim 16 wherein a pre-defined set of frames of a group of frames is selectively omitted based upon said distortion-related information for a respective said video stream.

19. The system of claim 17 wherein a pre-defined set of packets of a group of frames is selectively omitted based upon said distortion-related information for a respective said video stream.

20. The system of claim 13 wherein a pre-defined set of frames of a group of frames is selectively omitted based upon said proportion of the available said shared wireless channel.

21. The system of claim 15 wherein a pre-defined set of packets of a group of frames is selectively omitted based upon said proportion of the available said shared wireless channel.

22. The system of claim 1 wherein said distortion-related information is associated with a portion of a respective video stream.

23. The system of claim 22 wherein said distortion-related information is associated with a group of frames.

24. The system of claim 22 wherein said distortion-related information is associated with a frame.

25. The system of claim 22 wherein said distortion-related information is associated with a packet.

26. The system of claim 1 wherein said distortion-related information comprises a set of rate and distortion values.

27. The system of claim 1 wherein said distortion-related information comprises a distortion-rate function.

28. A system for transmitting video from a transmitter to a receiver comprising:
   (a) a plurality of frames of a video including intra-coded frames, predictive coded frames, and bi-predictive coded frames where each of said frames includes a plurality of packets;
   (b) an estimator estimating the effective bandwidth of the connection between said transmitter and said receiver;
   (c) determining a data rate for said plurality of frames based upon said estimation of said bandwidth;
   (d) identifying frames that should be transmitted, frames that should not be transmitted, and frames that should be only partially transmitted, based on at least one factor selected from the group consisting of (i) said data rate; and (ii) said intra-coded, predictive coded, or bi-predictive coded nature of said frames;

(e) selectively not transmitting to said receiver at least one of said packets of one of said frames that should be only partially transmitted, while transmitting other said packets of said frame from said transmitter to said receiver.

29. The system of claim 28 wherein said transmitting is over a shared wireless channel.

30. The system of claim 29 wherein said wireless channel is shared with at least one other transmitter.

31. The system of claim 28 wherein said estimation of said effective bandwidth is based on cross-layer information between a MAC layer and an application layer.

32. The system of claim 31 wherein said cross-layer information includes a time taken to successfully deliver a packet at the MAC layer.

33. The system of claim 28 wherein said estimation of said effective bandwidth is based on information transmitted from said receiver to said transmitter.

34. The system of claim 29 wherein said determining of said data rate includes determining a proportion of the available channel time for transmission over said shared wireless channel.

35. The system of claim 34 wherein said determining of said proportion is based on distortion-related information associated with said video.

36. The system of claim 35 wherein said distortion-related information is associated with a group of frames of said video.

37. The system of claim 35 wherein said distortion-related information is associated with a frame of said video.

38. The system of claim 35 wherein said distortion-related information is associated with a packet of said video.

39. The system of claim 28 wherein said determining of said data rate includes minimizing distortion of said video given a constraint on the available channel time for transmission of said video.

40. The system of claim 28 wherein said identifying is based on selecting a packet omission pattern from a set of packet omission patterns.

41. The system of claim 40 wherein each packet omission pattern is associated with a rate and a distortion.

42. The system of claim 40 wherein said set of packet omission patterns is determined by successively omitting packets from bi-predictive coded frames, followed by successively omitting packets from predictive coded frames.

43. The system of claim 42 wherein said omitting of packets from bi-predictive coded frames is based on the order of said frames in said video.

44. The system of claim 28 wherein said identifying results in exactly one frame to be identified as a frame that should be partially transmitted.

45. The system of claim 40 wherein said selection of said packet omission pattern is updated once every group of frames.

46. The system of claim 40 wherein said selection of said packet omission pattern is updated once every frame.

* * * * *